United States Patent [19]

Olson

[11] Patent Number: 4,915,185

[45] Date of Patent: Apr. 10, 1990

[54] PORTABLE AIRCRAFT MOVING DEVICE

[76] Inventor: Peter J. Olson, 4513-10 Cove Dr., Carlsbad, Calif. 92008

[21] Appl. No.: 185,495

[22] Filed: Apr. 25, 1988

[51] Int. Cl.$^4$ ............................................... B62D 51/04
[52] U.S. Cl. .................................. 180/19.2; 180/19.1; 180/343; 280/3
[58] Field of Search .................... 180/11, 12, 13, 19.1, 180/19.2, 74, 904; 280/3

[56] References Cited

U.S. PATENT DOCUMENTS

| 2,920,845 | 1/1960 | Palmiter | 180/74 |
| 2,949,972 | 8/1960 | Wirkkala | 180/74 |
| 3,150,734 | 9/1964 | Duggar, Jr. | 180/19.1 |
| 3,156,315 | 11/1964 | Hawgood | 280/3 |
| 3,183,013 | 5/1965 | Brown | 280/3 |
| 3,937,290 | 2/1976 | Benning | 180/74 |

Primary Examiner—Charles A. Marmor
Assistant Examiner—Donn McGiehan
Attorney, Agent, or Firm—John J. Murphey

[57] ABSTRACT

A portable aircraft moving device comprising a portable electric drill containing a drive shaft extending from the drill output shaft to a worm gear reducer having an output shaft connected to a drive wheel that is mounted temporarily to the front wheel of an airplane above the airplane wheel, the drive shaft located inside a straight hollow support tube attached between the drill and the gear reducer, so that by actuating the trigger on the drill, causes the drive shaft to be turned and produce, through the gear reducer, rotation of the drive wheel on an axis parallel to the axis of the airplane's wheel. Pivotal means are employed to allow the drive wheel to be rotated into contact with the airplane wheel, by lowering the drill, to impart rotation to the airplane's wheel and movement to the airplane.

2 Claims, 8 Drawing Sheets

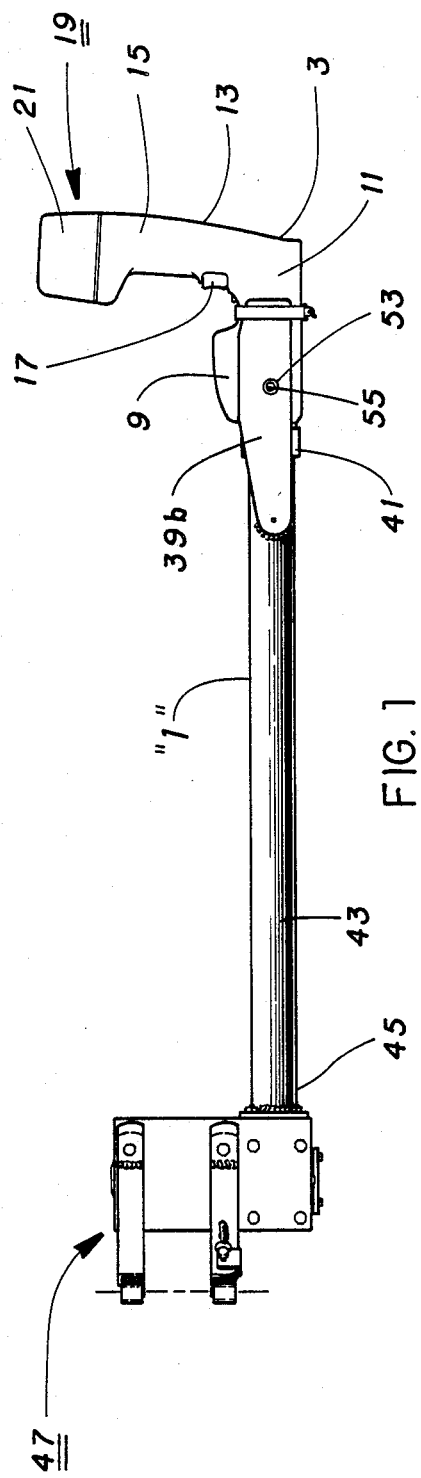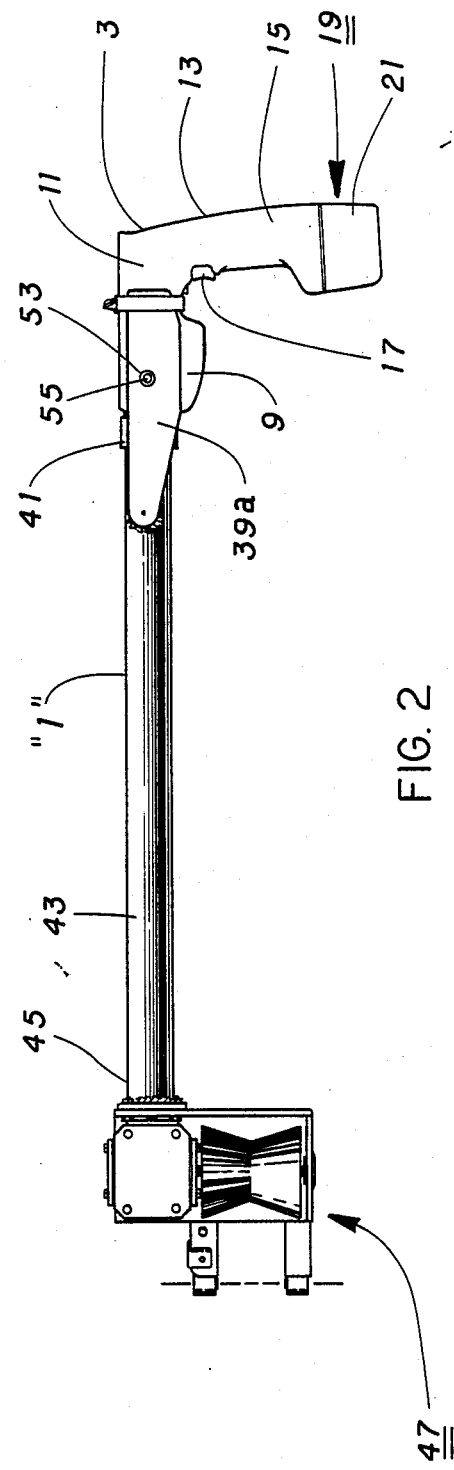

PORTABLE AIRCRAFT MOVING DEVICE

BACKGROUND OF THE INVENTION

1. Field of the Invention

This invention pertains to the field of aircraft ground maneuvering devices. More particularly, this invention pertains to hand-held portable aircraft towing devices powered by electricity as opposed to manual devices such as tow bars and the like.

2. DESCRIPTION OF THE PRIOR ART

Aircraft come in a variety of sizes, shapes and weights from huge multi-engine military and commercial airplanes weighing many tons to single and twin engine private and light commercial airplanes weighing a few thousand pounds. While aircraft seem to slip through the air with the greatest of ease, on the ground they are cumbersome vehicles, with relatively few handholds and wide soft tires, that are difficult and awkward to maneuver by hand. Whether in a hangar or out on the tarmac, pushing or pulling an airplane from one location to another is often the most physically difficult portion of the flight.

Female flyers have an even more difficult time. While both males and females are fully capable of flying an airplane, and while man can usually use his body weight to aid him in pushing a heavy aircraft, women being generally light-weight and of small frame often find it extremely difficult, if not impossible, to move the airplane on the ground. This has led some people to leave the sport of flying that they might otherwise enjoy.

A few attempts have been made to make the chore of moving aircraft easier. Virtually every airport has one or more manual tow bars that are nothing more than an elongated metal shaft having a handle at one end and a pair of ears or hooks at the other end for temporarily attaching to an aircraft to pull or push it. These are of little use for heavy aircraft, not recommended for female pilots because of the low mechanical advantage, and not good for any aircraft where the movement is to be up an inclined surface, such as is often encountered in aircraft parking areas.

Some airports have power-tow devices. They come in a variety of sizes and shapes, all with their own individual problems. One type comprises a gasoline engine powered dolly weighing over one hundred pounds; another type is an electrically-powered tow that weighs sixty pounds and requires an extension cord weighing an additional ten pounds. The gasoline-powered unit is generally too much for the female pilot and because of its weight cannot be carried in the aircraft. The electric device is limited in range to the length of the extension cord and also is too heavy to carry in the aircraft. Accordingly, these prior art devices are confined to one location which is exactly one-half or less of the number of locations to be visited by the pilot.

SUMMARY OF THE INVENTION

This invention is a truly portable, very lightweight and relatively inexpensive aircraft moving device. It utilizes a cordless electric drill. It's operation involves the simple steps of attaching it temporarily to the aircraft and pulling the trigger-switch on the drill while at the same time pushing downward on the drill handle to bring the drive wheel into contact with the front wheel of the aircraft. Simply raising and lowering the device against the aircraft's front tire provides very efficient and accurate one-hand control of the airplane. With a cordless electric drill, the device may be used anywhere. One embodiment of the invention includes an a.c. powered drill and an extension cord generally useful where the device is going to be kept around a hangar or other covered storage. The device is so light and compact as to be easily carried in the aircraft for use anywhere. In addition, one embodiment of the battery for powering the electric drill may be placed in a charging device in the airplane while in flight to bring it back to full charge so that its full capacity may be realized at the next ensuing landing place of the aircraft. In another embodiment, the device utilizes the aircraft's own battery to power the drill.

The invention comprises a hand-held electric drill that is attached to one end of an elongated support tube where the other end of the tube is attached to a power diverter and speed reducer adapted to be pivotally attached by a releasable connection to the aircraft adjacent its front wheel. A drive shaft is interconnected between the drill output shaft and the power diverter for rotation with the drill in response to a squeeze of the trigger switch. The power diverter and reducer redirects rotation of the incoming drive shaft along an output axle whose axis is substantially parallel to the aircraft's front wheel. A drive wheel attached to the output axle, rotating at a slower speed than the drill, is pressed into tangential contact with the upper front of the aircraft's front wheel by downward pressure exerted on the drill handle. This allows a one-hand operation to start, stop, engage the drive wheel and to change the direction of the moving aircraft solely at the handle of the drill.

Additional features include using a drill that has a variable speed, through variable movement of the drill trigger to vary the speed of movement of the aircraft. Further, one may incorporate a reversible drill to provide forward and reverse motion of the aircraft. By locating the relatively heavy hand drill at the far end of the device, adjacent the handle and actuation switch, the weight of the drill is used effectively to help bring drive wheel pressure against the front wheel of the airplane thereby providing substantial mechanical advantage to the overall design and bring the act of moving the aircraft fully within the capability of both men and women. By this means, complex, and other substantially heavy components found in prior art towing devices have been eliminated. There is thus produced a mechanism whereby men and women, large and small, may easily move an aircraft without need to start and stop gasoline engines, work with heavy and cumbersome electrical extension cords and most importantly, without having to leave the device behind when they proceed to the next place of landing.

Accordingly, the main object of this invention is a lightweight, portable aircraft moving device that may be carried in the aircraft and used wherever the pilot lands. Other objects include a device that is compact and contains relatively few parts; a device where the battery that powers the drill may be recharged during flight for use at other points of landing, a device light enough to be transportable without a large weight penalty and that is useful in moving a wide variety of aircraft.

These and other objects of the invention will appear more clear when reading the following description of the preferred embodiments when taken together with the drawings that are appended hereto. The scope of protection desired by the inventor may be gleaned from a fair reading of the claims which conclude this specification.

DESCRIPTION OF THE DRAWINGS

FIG. 1 is a top plan view of one embodiment of this invention;

FIG. 2 is a bottom plan view of the embodiment shown in FIG. 1;

DESCRIPTION OF THE PREFERRED EMBODIMENT

Figure 3:
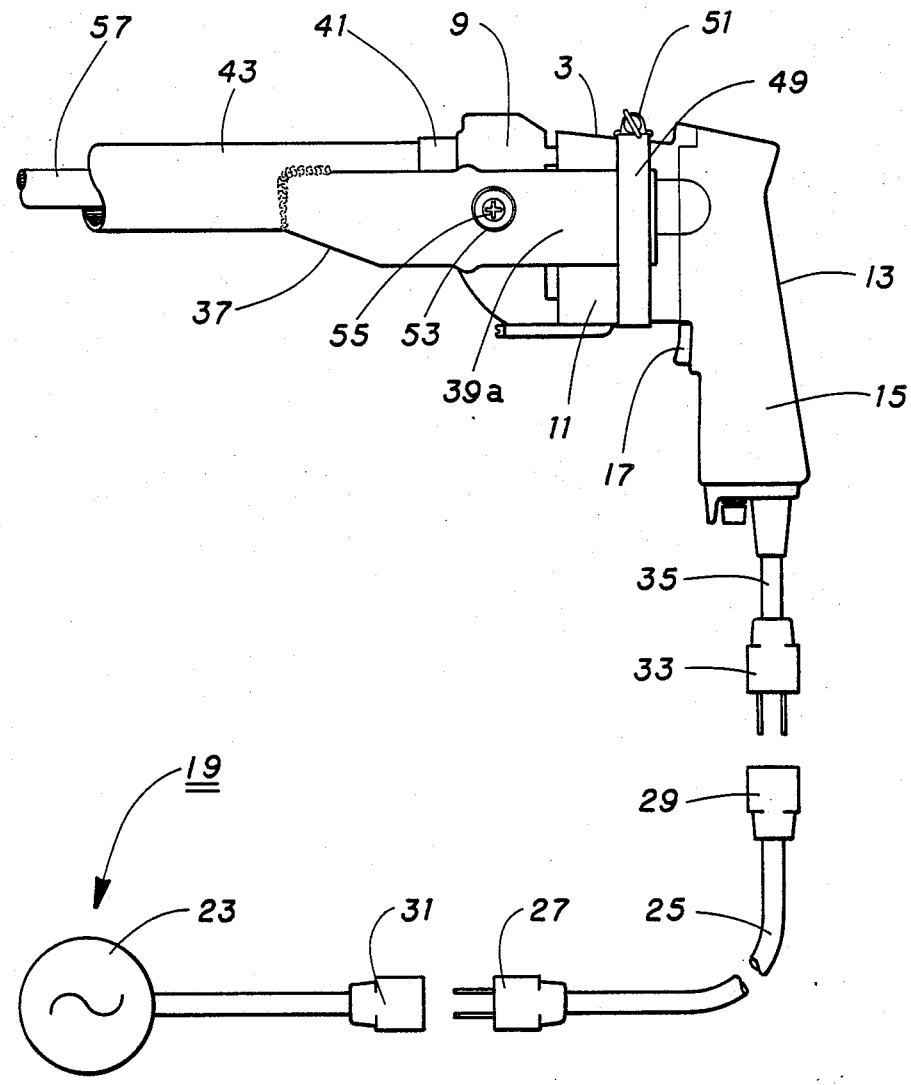
FIG. 3 is a close-up bottom plan view of another embodiment of the drill showing the use of an electric extension cord to provide electrical energy to the drill motor.

Turning now to the drawings wherein like elements are identified with like numerals throughout the nine drawings, this inventive device is generally shown and identified by the numeral "1". In the Figures device 1 is shown to comprise a hand-held portable electric drill 3 that includes a rotating output shaft 5 having a forward extending shaft end 7 (see FIG. 4) powered by an electric motor indicated generally at 9 that are all operably mounted in a drill body 11 that is set atop and forward of a pistol-grip shaped handle 13. Handle 13 contains a palm-grasping portion 15, extending generally downward and to the rear of motor 9, and a finger-actuated electric switch 17, generally located in front of portion 15, for squeezing with the fore-finger to activate drill motor 9.

A first means 19 is provided for energizing electric drill 3. In FIGS. 1 and 2 means 19 is shown to comprise a battery 21 attached to and made part of palm-grasping handle portion 15. Such batteries are generally either received in handle portion 15, removable for replacement or recharging, or are made in the shape of palm-grasping portion 15 and attached thereto to form said handle 13. Preferred in this embodiment of the invention is a battery 21 that is separable from drill handle 13 and insertable into a separate receptacle (not shown) for recharging. Such batteries are already known in the art as is the receptacle. Said receptacle contains a means to make the incoming voltage compatible with the battery, where needed, as well as means for monitoring and controlling the flow of current into the battery so that it does not become damaged by overcharging. Such a receptacle may be easily and conveniently mounted somewhere in the interior of the aircraft and attached to the aircraft's electrical system for use in flight to charge the battery after take-off and before landing to insure a full charge at the next landing point. An example of a portable electric drill of the type just described and usable herein is a Model 2735 Cordless Drill, manufactured by Skil Tools, Inc. Chicago, Ill.

As shown in FIG. 3, means 19 may comprise a remote source 23 of electric current, such as a.c. current, that is connectable to drill 3 by an elongated electric extension cord 25, having male and female end plugs 27 and 92, for attachment respectively to a female receptacle 31 on remote source 23 and male plug 33 that extends from a short wire 35 emanating from the bottom of palm-grasping portion 15. This latter embodiment is especially useful where device 1 will remain at a single location, such as an aircraft hangar, and be continually used to move the aircraft in and out of that hangar as opposed to taking it on extensive trips. An example of a portable electric drill of the type just described and usable herein is a Model 4700 Portable Drill, 110 volts, a.c. powered, manufactured by Makita Electric Works Ltd., Japan. In another embodiment of this invention, remote electrical source 23 may be the aircraft's own battery carried internally within the aircraft. Extension cord 25 would then connect said battery to drill 3 through the aforesaid male and female receptacles to provide the requisite power to move the aircraft.

As shown in FIGS. 1, 2 and 3, drill body 11 is placed in a saddle 37 comprised of a pair of mutually spaced apart, elongated plates 39a and 39b that are welded or otherwise attached near the first end 41 of an elongated tube 43, the second end 45 of tube 43 being attached to a second means 47 as will be hereinafter more fully explained. A strap 49 may extend around drill body 11, that encloses electric motor 9, and over plates 39a and 39b, and tightened at clamp screw 51 to hold drill 3 in rigid position at tube end 41. On some models of electric drills there is a threaded aperture at the side of the motor housing for insertion of a side handle to steady the drill during usage. As shown in FIGS. 1–4, an aperture 53 is formed in plate 39a in registration with the threaded receptacle on drill 3 so that the side handle may be replaced with a short threaded bolt 55 that is tightened therein to aid in holding drill 3 rigidly against first tube end 41.

An elongated drive shaft 57 having spaced-apart first and second ends 59 and 61 respectively is set parallel to and preferably received inside of elongated tube 43 and attached at said first end 59 to drill output shaft forward end 7. Elongated tube 43 and drive shaft 57 may be set in side-by-side arrangement, however, it is preferred that drive shaft 57 be placed inside tube 43 for compactness and safety. Further, while tube 43 and shaft 57 may be made solid throughout, it is preferred that they both be made hollow, from strong material such as aluminum or steel and be thin-walled for light weight. Examples of tubing that may be utilized as elongated tube 43 and drive shaft 57 are 6061-T6 aluminum tubing having a wall thickness ranging from 0.058–0.065 inches and 1020 mild steel tubing having a wall thickness of 0.065 inches.

Figure 4:
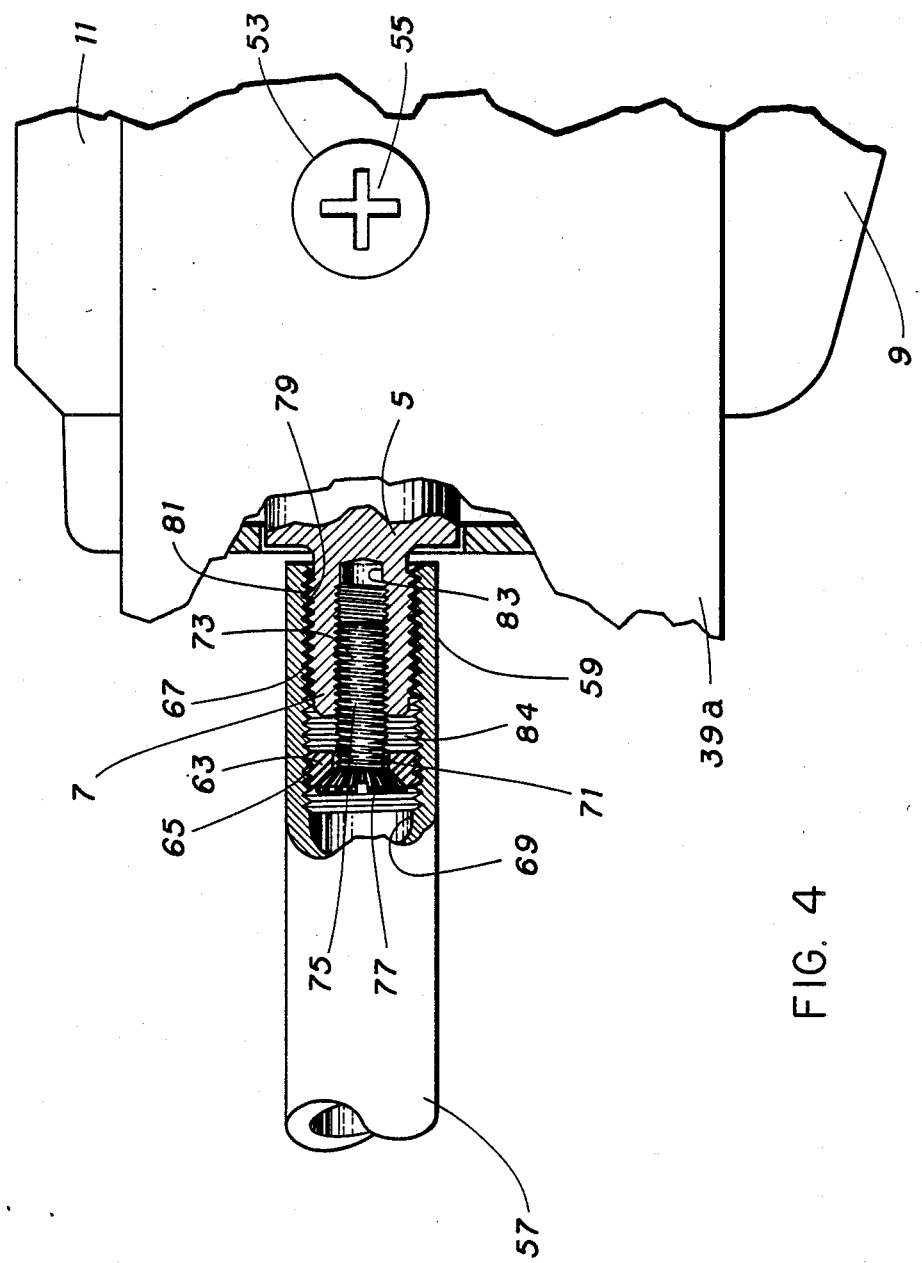
FIG. 4 is a side elevational, partially sectional, view of one embodiment of connection between the drive shaft and the drill output shaft.

As shown in FIG. 4, first drive shaft end 59 is preferably connected to drill output shaft end 7 through a rigid coupling connection. A typical type of connection is shown to comprise a washer-shaped insert 63 having a threaded circumference 65 for mutual engagement with like threads 67 cut or formed on the inside wall 69 of drive shaft end 59. Said insert 63 has formed therein a smooth-bore central aperture 71 for receipt therethrough of the threaded shaft 73 of a bolt 75 whose bolt head 77 is positioned on the opposite side of insert 63 from drill forward shaft end 7. The threads of bolt shaft 73 are opposite in direction from the threads of threaded insert circumference 65 and drive shaft end threads 67. Matching threads 79 are formed about drill forward shaft end 7 for receipt thereover of the threaded portion of drive shaft end 59. Depending upon the relative diameters of shaft end 7 and inside tube wall 69, a separate thread reinforcing coil 81, such as a Helicoil (tm), manufactured by Heli-Coil Products, Division of Mite-Corporation, Danbury, Conn., may be inserted therebetween to assist in obtaining a rigid connection. A central bore 83 is formed forward shaft end 7 and threaded in the same direction and diameter as bolt shaft 73 for threaded receipt therein to lock drive shaft end 59 into rigid connection with output shaft 5 and to compensate for any drive shaft length variation. Adhesive, such as Locktite 290 (tm) may be added to the mating surfaces of the aforesaid components to retain them in position notwithstanding coil 81 established between insert 63 and forward shaft end 7.

As an alternate embodiment, elongated drive shaft 57 may be connected to electric drill output shaft end 7 by the use of the drill's chuck (not shown) being open to receive first drive shaft end 59 in clasping relationship therein, said drive shaft end 59 formed with circumferential lands or other grasping geometry, and thereafter tightened. While this latter embodiment is not preferred it is possible thereby allowing drill 3 to be temporarily and conveniently separated from device 1 and used for other purposes.

Figure 5:
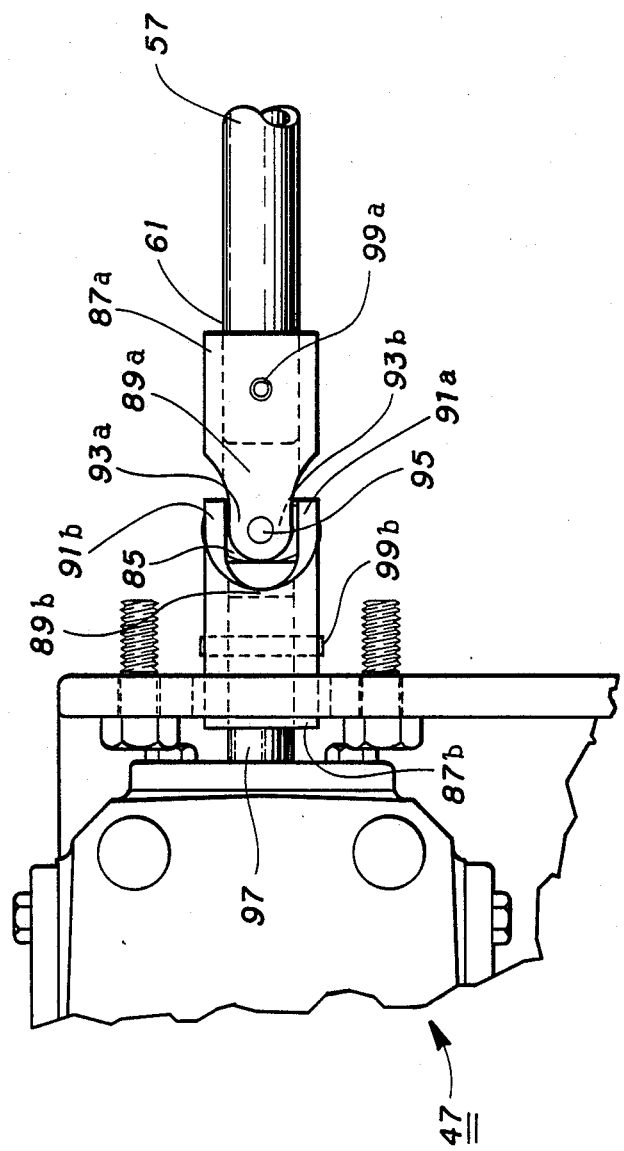
FIG. 5 is a side elevational, partially fragmented, view showing one embodiment of the universal joint attached to the drive shaft.

A universal joint 85 is interposed shaft 57 to compensate for shaft bending during use of device 1. As shown in FIG. 5, joint 85 is comprised of a pair of sleeves 87a and 87b axially aligned with their adjacent ends 89a and 89b formed into pairs of mutually spaced-apart ears 91a and 91b and 93a and 93b interconnected by a pivot pin 95 as is generally known in the art. Sleeve 87a is slipped over second drive shaft end 61 and sleeve 87b is slipped over second means input shaft stub 97; both are held fast to their respective inserted shafts by keyways (not shown) or by roll pins 99a and 99b received in bores formed through the respective sleeve and shaft.

Figure 6:
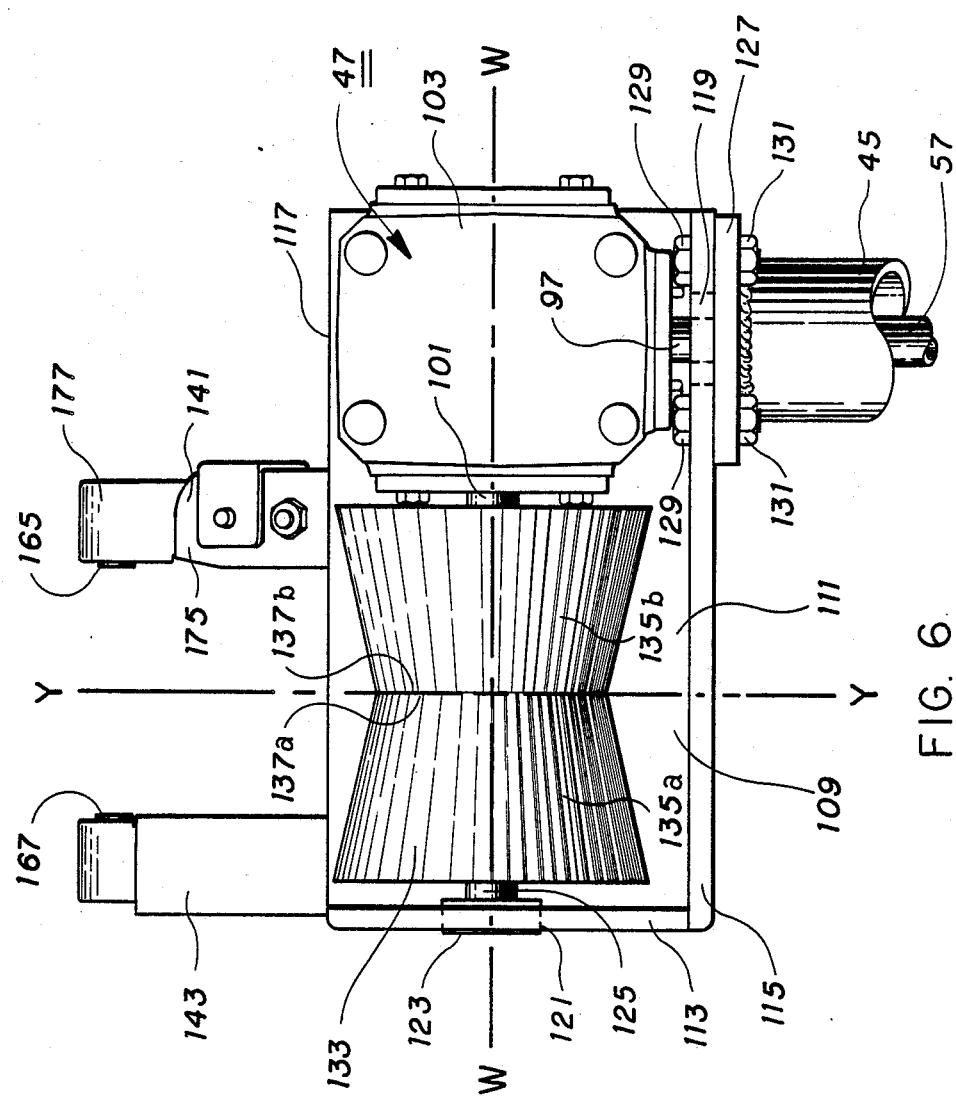
FIG. 6 is a bottom plan view of one embodiment of the power diverter and aircraft wheel drive means.

As shown in FIGS. 5 and 6, second means 47 is provided and connected to drive shaft 57 through universal joint 85 for reducing the input rotation speed from drill 3 and divert it to a slower output rotation about an output shaft stub 101 whose central axis W—W is aligned substantially parallel to the axis of rotation X—X of the front wheel of the aircraft when device 1 is pivotally attached to the aircraft. As shown in FIG. 6, one embodiment of second means 47 comprises a worm-gear type reducer 103 connected through input shaft stub 97 and universal joint 85 to drive shaft second end 61. An internal worm gear and meshed drive gear (not shown) are arranged to reduce the incoming rotation speed of input shaft stub 97 to a lower speed and correspondingly higher torque and divert the output shaft rotation to output shaft stub 101. While the angle between drive input shaft stub 97 and output shaft stub 101 may vary with different situations, it is preferred that it be maintained at approximately 90°. An example of second means 47 of the type just described and usable herein is a Model 710-10-J Worm Gear Reducer manufactured by Boston Gear, Incom International Inc. of Boston, Mass.

Examples of other means 47 for reducing the incoming speed of drive shaft 57 and for changing the direction of rotation from a direction aligned with drive shaft 57 to an output shaft stub 101 whose axis of rotation is parallel to the axis of rotation of the aircraft's front wheel exist such as separate planetary rotary speed reducing devices for implantation along drive shaft 57 or along the axle axis as well as diverters such as universal joints that change the direction of rotation without reducing speed. All of these different types of means are fully contemplated in this invention.

Figure 8:
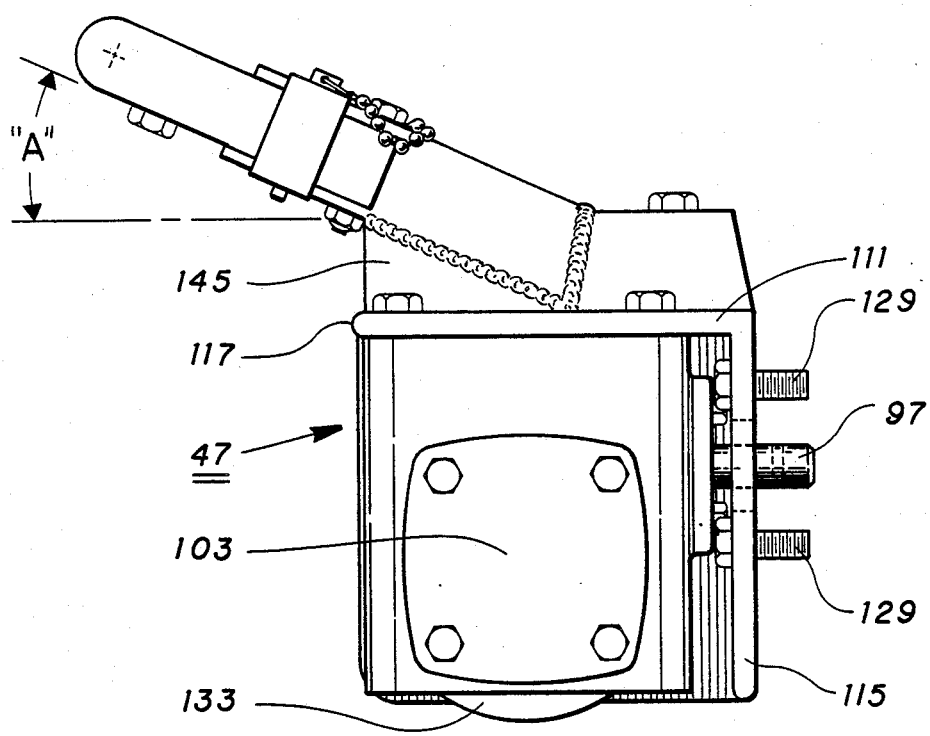
FIG. 8 is a side elevational view of the embodiment shown in FIGS. 6 and 7 showing one particular embodiment of the pivotal attachment means.

A bracket 109, defined by a base plate 111, an upstanding side wall 113, an upstanding rear wall 115 and front edge 117, is provided on which is mounted second means 47. Second means 47 is shown in FIGS. 6 and 8 to be mounted to base plate 111 with bolts 107 received in threaded apertures formed therein (not shown). An aperture 119 is formed in rear wall 115 through which passes input stub 97. Another aperture 121 is formed in bracket side wall 113 opposite output shaft stub 101 and is adapted to receive a bearing 123 therein. An axle 125 is attached and keyed to output shaft stub 101 and is supported in bearing 123 for turning therein with output shaft stub 101. A flange 127 is welded or otherwise attached to elongated tube second end 45 and bolted to bracket rear wall 115 with bolts 129 and nuts 131. By this means drill 3, elongated tube 43, drive shaft 57, second means 47 and bracket 109 are all maintained in fixed geometry.

As shown in FIGS. 6 and 8, a drive roller or wheel 133 is fixedly mounted on axle 125 for rotation with second means output shaft stub 101 in response to rotation of drill motor 9 turning drive shaft 57. Drive wheel 133 is made of frictional material and shaped for tangential contact against the front tire of the aircraft to be moved. While a wide variety of materials and shapes are usable herein, it is preferred to have drive wheel 133 made of hard wood, such as oak, and be made in the shape of a pair of face-together contiguous frustums 135a and 135b where their smaller diameters 137a and 137b lie in a common plane Y—Y and are jointed together at said plane. Wheel 133 is conveniently attached to axle 125 by adhesive bonding, pins or other known means.

Figure 7:
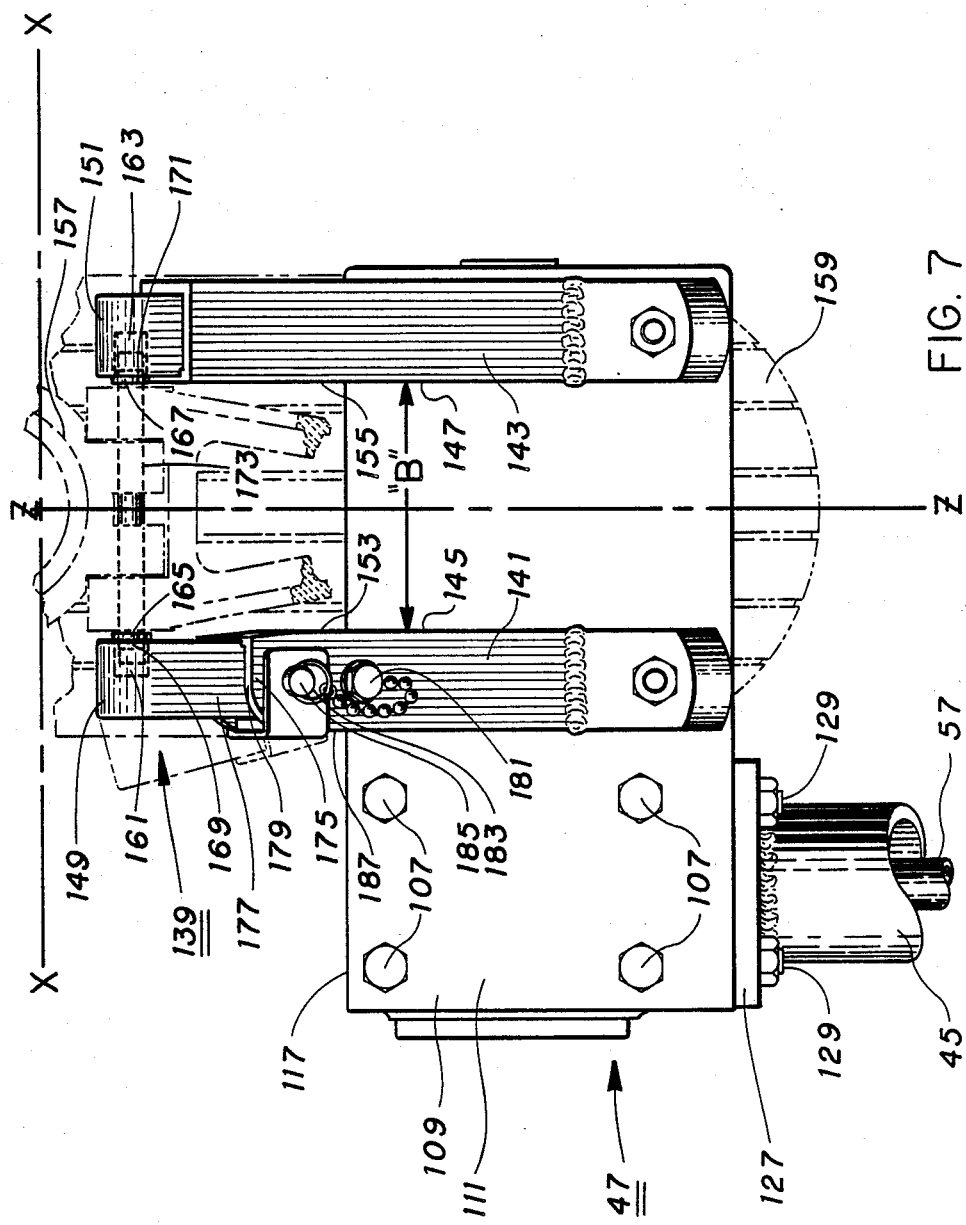
FIG. 7 is a top view of the embodiment shown in FIG. 6 and shows in greater detail the pivotal means for attaching the device to the aircraft.

Attached to the underside of bracket base plate 111 and extending forward of bracket front edge 117 is pivotal means 139 for temporarily attaching device 1 to the aircraft such that drive wheel 133 is able to be brought into tangential contact wherein plane Y—Y is co-planar with the plane Z—Z of the front wheel of the aircraft as shown in FIG. 7.

One embodiment of pivot means 139 comprises a pair of spaced-apart elongated fingers 141 and 143, arranged mutually parallel and attached to the underside of base plate 111 at an angle "A" by welding or otherwise through a pair of small, triangular shaped brackets 145 and 147 that are attached between base plate 111 and fingers 141 and 143. Said fingers 141 and 143 extend in the same direction beyond base plate front edge 117 and terminate in distal ends 149 and 151. Preferably, fingers 141 and 143 are formed in square or rectangular hollow cross-section for weight advantage having mutually parallel, facing, spaced-apart walls 153 and 155. The distance between said walls 153 and 155 is shown in FIG. 7 as "B" and is slightly larger than the aircraft attachment points or strut 157 (shown in phantom) for the front wheel 159 (shown in phantom) of the aircraft on which device 1 is to be used. A pair of spaced-apart yet facing apertures 161 and 163, preferably lined with steel sleeves 165 and 167, are formed in walls 153 and 155 near distal ends 149 and 151 for receipt therein of the ends 169 and 171 of a cross-pin 173 that is normally found in tubular strut 157 above front aircraft wheel 159.

The phantomed strut and wheel assembly shown in FIG. 7 is that found in a Beech model aircraft. Other configurations of pivotal means 139 may be needed for other designs of aircraft, such as for instance the Cessna model aircraft where the cross-pin is found rearward of that found in the Beech, or such as in the Piper aircraft where the cross-pin is replaced by a flat member having rounded ends but containing an aperture adjacent each end of the pin. In this latter situation, fingers 141 and 143 would be narrowed and curved to temporarily fit through these apertures to operably connect device 1 to the front of the aircraft. All of these means are fully contemplated herein.

In the particular embodiment shown in FIG. 7, finger 141 is made in two parts: a first larger part 175 that is welded or otherwise attached through bracket 145 to base plate 111 and extending a short distance beyond front edge 117 and a second, smaller cross-sectional element 177 that is partially received in first larger part 175 at its opened end 179 and is adapted to pivotally rotate by a hinge-pin 181 passing therethrough. A crossbore 183 is formed through parts 175 and 177 outboard of hinge pin 181 and is adapted to receive therein a lock pin 185 when apertures 161 and 163 are placed over the cross-pin ends 169 and 171 to pivotally attach device 1 on aircraft front strut 157. A cutout portion 187 is formed in finger 175, opposite finger wall 153 to allow smaller finger part 177 to pivot off of its centerline into the opposite direction to allow apertures 161 and 163 to be placed about cross-pin 173 as shown in dotted lines in FIG. 7.

Figure 9:
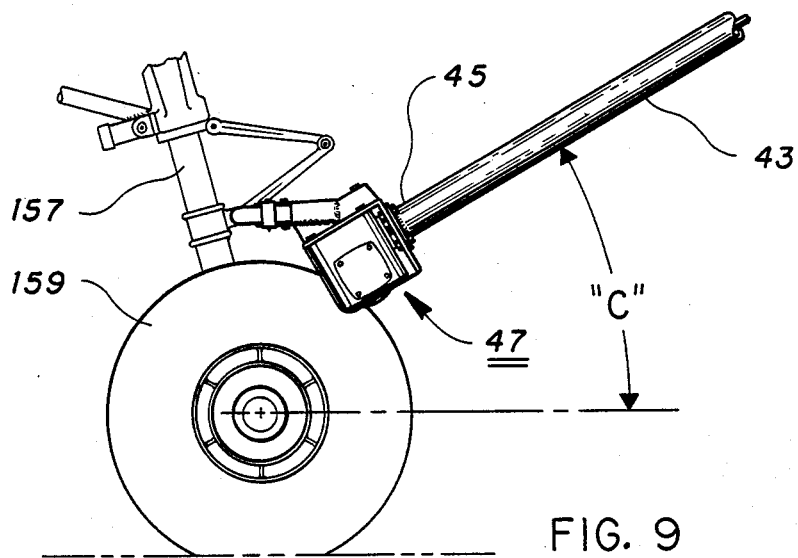
FIG. 9 is a side elevational view showing the device temporarily attached to an aircraft and ready for use; and, FIG. 10 is an illustrative view showing a person utilizing the invention to move an aircraft.
Figure 10:
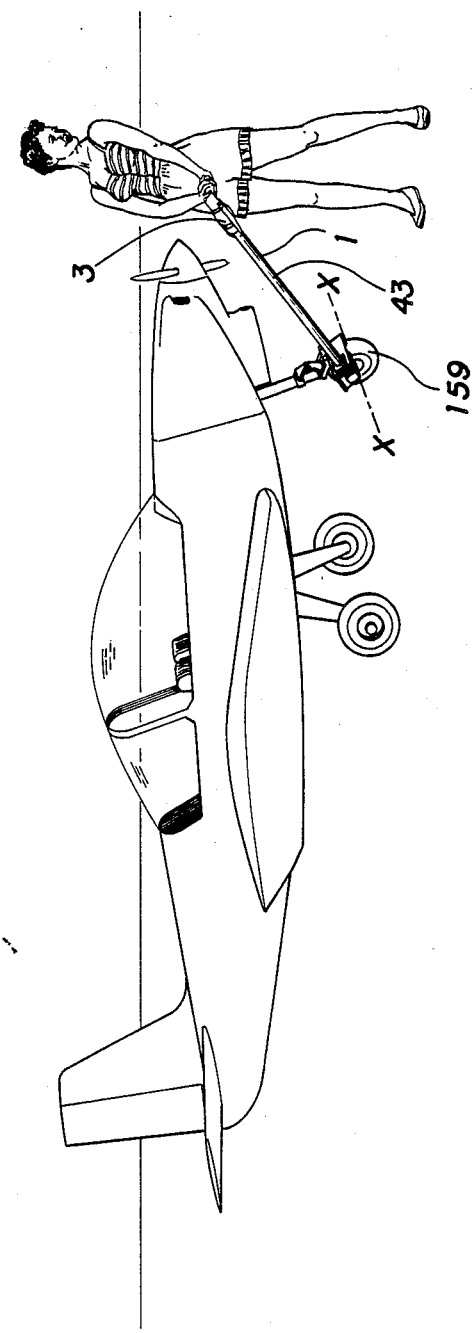

In operation, fingers 141 and 143 and apertures 161 and 163 are placed over exposed cross-pin ends 169 and 171. Lock-pin 185 is then inserted into cross-bore 183 to lock fingers 141 and 143 in position about strut 157 and temporarily pivotally attach device 1 to the aircraft above its wheel 159. As shown in FIG. 9, tube 43 supports drill 3 out in front of aircraft front wheel 159 and at an angle "C" of approximately 40° above the surface over which the aircraft is to be moved. As shown in FIG. 10, the user merely grasps drill handle 13 and pushes downward to swing drive wheel 133 down against aircraft front wheel 159. By squeezing finger-actuated switch 17, drill motor 9 is caused to turn drive wheel 133 against aircraft wheel 159 to move the airplane. Swinging drill 3 to the left or to the right will cause the moving airplane to veer toward that particular direction. Angle "C" will vary depending upon the type of aircraft, size of the aircraft's wheel and tire and size of drive wheel 133.

What is claimed is:

1. A portable aircraft moving device comprising:
   (a) a portable electric drill including a rotating output shaft and shaft end powered by an electric motor housed in a covering body and mounted on a piston grip-shaped handle containing a finger-actuated switch to activate the drill motor;
   (b) first means for powering said drill;
   (c) an elongated tube of terminal length having spaced-apart first and second ends wherein said first tube end is attached to said hand drill to support it rigidly on said tube;
   (d) an elongated drive shaft of terminal length having spaced-apart first and second ends wherein said shaft is attached at said first end to said drill output shaft for rotation therewith in response to actuation of the drill motor;
   (e) second means attached to said elongated tube and said drive shaft for reducing the rotary speed of said drive shaft and directing the input rotation thereof to an output rotation at an angle thereto;
   (f) an axle attached to said second means having an axis of rotation substantially parallel to the axis of rotation of the front wheel of the aircraft;
   (g) a drive wheel mounted on said axle for rotation therewith; and,
   (h) pivotal means for temporarily attaching said device to the aircraft such that said drive wheel is in close tangential contact with the front wheel of the aircraft and said drill is cantilevered out in front of the aircraft at an acute angle with the surface over which the aircraft is to be moved so that by raising said drill said device is pivoted upward and by lowering said drill said device is pivoted downward and said drive wheel is brought into contact with the front wheel for moving the aircraft when said drill switch is actuated;
   (i) wherein said connection between said first end of said drive shaft and said drill output shaft comprises:
      (i) a washer-shaped insert having a threaded circumference for mutual engagement with threads formed on the inside wall of said first tube end;
      (ii) said insert having formed therein a smoothbore central aperture for receipt therethrough of the threaded shaft of a bolt whose bolt head is positioned on the opposite side of said insert from said drill forward shaft end;
      (iii) the threads of said bolt shaft being in the opposite direction from the threads of said threaded insert circumference and said tube wall threads; and wherein matching threads are formed about said drill forward shaft end for receipt thereover of said threaded portion of said first tube end and a separate thread reinforcing coil inserted between said matching threads and said threads of said first tube end for locking therebetween; and,
      (iv) a central bore formed in said forward shaft end and threaded in the same direction and diameter as said bolt shaft for threaded receipt therein to lock said tube end into rigid connection with said output shaft.

2. A portable aircraft moving device comprising:
   (a) a portable electric drill including a rotating output shaft and shaft end powered by an electric motor housed in a covering body and mounted on a piston gripshaped handle containing a finger-actuated switch to activate the drill motor;
   (b) first means for powering said drill;
   (c) an elongated tube of terminal length having spaced-apart first and second ends wherein said first tube end is attached to said hand drill to support it rigidly on said tube;
   (d) an elongated drive shaft of terminal length having spaced-apart first and second ends wherein said shaft is attached at said first end to said drill output shaft for rotation therewith in response to actuation of the drill motor;
   (e) second means attached to said elongated tube and said drive shaft for reducing the rotary speed of said drive shaft and directing the input rotation thereof to an output rotation at an angle thereto;

(f) an axle attached to said second means having an axis of rotation substantially parallel to the axis of rotation of the front wheel of the aircraft;

(g) a drive wheel mounted on said axle for rotation therewith; and, (h) pivotal means for temporarily attaching said device to the aircraft such that said drive wheel is in close tangential contact with the front wheel of the aircraft and said drill is cantilevered out in front of the aircraft at an acute angle with the surface over which the aircraft is to be moved so that by raising said drill said device is pivoted upward and by lowering said drill said device is pivoted downward and said drive wheel is brought into contact with the front wheel for moving the aircraft when said drill switch is actuated;

(i) further including a bracket defined by a base plate, an upstanding rear wall, an upstanding side wall and a front edge wherein said second means is mounted thereon and said second end of said elongated tube is attached thereto;

(j) wherein aid pivotal means for temporarily attaching said device to the aircraft comprises:
  (i) a pair of spaced apart elongated fingers arranged mutually parallel and attached to the underside of said base plate at an angle through a pair of small, triangular shaped brackets attached therebetween, said fingers extending beyond said base plate front edge and terminating in distal ends and defining a pair of mutually parallel, facing, spaced apart finger walls set a distance apart slightly larger than the outside diameter of the tubular strut for the front wheel of the aircraft on which said device is to be attached;
  (ii) a pair of spaced-apart yet facing apertures formed in said walls near said distal ends for receipt therein of the ends of a cross-pin through the tubular strut above the front aircraft wheel;
  (iii) one of said fingers being comprised of two parts: a first larger part attached to said base plate and extending a short distance beyond said bracket front edge and a second, smaller cross-sectional part partially received in said first part and adapted to be pivotally hinged therein by a hinge-pin passing therethrough including a cut-out formed in said larger part to allow said smaller part to swing in both directions out of alignment with said larger part;
  (iv) a cross-bore formed through said large part and said smaller part, outboard of said hinge pin adapted for mutual alignment when said first and second parts are in alignment; and,
  (v) a lock pin for insertion in said cross-bore when said fingers are placed about the aircraft strut and said apertures registered over the cross-pin ends to temporarily lock said device in pivotal attachment on the aircraft front strut over the wheel.

* * * * *